United States Patent [19]
Fukuda et al.

[11] Patent Number: 5,338,320
[45] Date of Patent: Aug. 16, 1994

[54] FLAT PLATE-LIKE RIBBED POROUS CARBON MATERIAL AND MANUFACTURING METHOD THEREFOR

[75] Inventors: Hiroyuki Fukuda; Masayuki Funabashi; Hikonori Abe, all of Iwaki, Japan

[73] Assignee: Kureha Kagaku Kogyo Kabushiki Kaisha, Tokyo, Japan

[21] Appl. No.: 49,312

[22] Filed: Apr. 21, 1993

Related U.S. Application Data

[62] Division of Ser. No. 674,335, Apr. 17, 1991, Pat. No. 5,236,687.

[30] Foreign Application Priority Data

Oct. 17, 1989 [JP] Japan .................. 1-269680

[51] Int. Cl.$^5$ ............................................. H01M 4/88
[52] U.S. Cl. .............................. 29/623.1; 264/29.1
[58] Field of Search ............. 264/29.1, 29.2, 29.3, 264/105, 118, 119, 176.1, 177.17, 177.19; 423/447.2; 429/143; 29/623.1

[56] References Cited

U.S. PATENT DOCUMENTS

| | | |
|---|---|---|
| 4,165,349 | 8/1979 | Sandelli . |
| 4,459,342 | 7/1984 | Shigeta .................. 429/34 |
| 4,490,447 | 12/1984 | Battersby ............... 429/143 |
| 4,506,028 | 3/1985 | Fukuda . |
| 4,738,872 | 4/1988 | Lee . |
| 4,814,307 | 3/1989 | Funabashi . |

FOREIGN PATENT DOCUMENTS

| | | |
|---|---|---|
| 57-210571 | 12/1982 | Japan . |
| 58-117649 | 7/1983 | Japan . |
| 59-49156 | 3/1984 | Japan . |
| 60-59663 | 4/1985 | Japan . |
| 61-768 | 1/1986 | Japan . |
| 63-697 | 1/1988 | Japan . |
| 63-968 | 1/1988 | Japan . |
| 63-21753 | 1/1988 | Japan . |
| 63-269459 | 11/1988 | Japan . |

*Primary Examiner*—Anthony Skapars
*Attorney, Agent, or Firm*—Cushman, Darby & Cushman

[57] ABSTRACT

A ribbed porous carbon material (1) is a one piece molded product containing carbon fibers (5) and having a rib portion (2) and a web portion (3), in which the carbon fibers (5) are oriented in the rib portion (2) along the direction of the thickness of the web portion (3), while the carbon fibers (5) are oriented in the web portion (3) along the direction of the plane of the web portion (3) and along the direction perpendicular to the rib portion (2).

4 Claims, 1 Drawing Sheet

FLAT PLATE-LIKE RIBBED POROUS CARBON MATERIAL AND MANUFACTURING METHOD THEREFOR

This is a division of application Ser. No. 07/674,335, filed Apr. 17, 1991, now U.S. Pat. No. 5,236,687.

TECHNICAL FIELD

The present invention concerns a flat plate-like ribbed carbon material of great strength containing carbon fibers and improved with electric conductivity and thermal conductivity along the direction of the thickness that can be used advantageously as an electrode substrate for a fuel cell, as well as a manufacturing method therefor.

BACKGROUND ART

As an electrode substrate for a fuel cell of low electric resistance, there has been known an electrode plate for a fuel cell constituted with a material mainly comprising carbon fibers and having a plurality of gas diffusing pores, in which a thin-walled portion formed as a plate-like member functions as a flow channel for a fuel and an oxidizing gas while a thick-walled portion functions as a collector portion, wherein the carbon fibers constituting the collector portion comprise mono-filaments dependent on each other with the fiber axis thereof substantially oriented along the direction of the thickness of the thick-walled portion (Japanese Patent Laid Open No. Sho 57-210571). As an example for the manufacturing method thereof, the following method is disclosed. An aqueous dispersion containing carbon fibers having a length longer than the thickness of the collector portion properly dispersed therein is prepared, which is subjected to filtering operation by way of filters made of a stainless steel metal wire gauze of about 150 mesh and the carbon fibers are settled on the filters to form a mat-like carbon fibers. Upon filtering operation, if the filtering speed is increased by using a vacuum pump, the carbon fibers settled in a mat-like shape on the filters are oriented along the direction of filtration. The mat-like carbon fibers are impregnated with a binder, for example, a phenol resin, are formed with gas flow channels by hot pressing and, subsequently, they are calcined for carbonizing the binder.

In this method, however, the mat-like carbon fibers are liable to become inhomogenous and it is extremely difficult to manufacture an electrode plate of uniform physical property. This results in a serious problem, in particular, for manufacturing a substrate of large size. In addition, the strength of the electrode plate of such a structure is low at the boundary between the thick-walled portion and the thin-walled portion and it is easily broken.

As a method of fabricating a ribbed porous carbon material, there has been known a method of supplying a dry mixture comprising 20 to 50% by weight of a thermosetting resin and 80 to 50% by weight of carbon fibers in such a predetermined amount as to provide a desired porosity into a molding die in a mirror image relationship with the rib pattern desired in the substrate, press molding and then calcining the same (U.S. Pat. No. 4,165,349). Further, there has also been known a method of manufacturing an electrode substrate for a fuel cell having a large porosity and a pore diameter with a sharp distribution, by mixing carbon fibers, a binder and an organic particulate material, press molding them by pressing or rolling, followed by calcination (Japanese Patent Laid Open No. Sho 58-117649).

In this method, however, the starting material tends to be supplied unevenly to the molding die or the roll thus tending to make the physical property of the resultant substrate not uniform.

Furthermore, there has also been known a method of manufacturing an electrode substrate having a uniform physical property by extruding a starting mixture comprising short carbon fibers, a phenolic resin and a molding aid, press molding the same by means of rolling or stamping and then calcining the same (Japanese Patent Laid Open No. Sho 63-21753).

However, even the porous carbon material manufactured by such a method can not completely satisfy the physical property such as electric resistance, heat conductivity and strength required in the field of the fuel cell and a further improvement has been demanded.

It is required for the ribbed porous electrode substrate for used in a fuel cell that the electric conductivity and the thermal conductivity, in particular, those along the direction of the thickness of the substrate is high and the thickness is reduced in order to increase the power generation capacity per unit volume of a cell and reduce cost for the power generation, and it is necessary to have a sufficient strength not to be broken upon handling during assembling of a cell stack or fabrication of the substrate even if it is thin.

An object of the present invention is to provide a flat plate-like ribbed porous carbon material of great strength, as well as a manufacturing method therefor.

Another object of the present invention is to provide a ribbed porous carbon material with high electric conductivity and thermal conductivity along the direction of the thickness, as well as a manufacturing method therefor.

A further object of the present invention is to provide a ribbed porous carbon material of highly uniform physical property, as well as a manufacturing method therefor.

DISCLOSURE OF INVENTION

The ribbed porous carbon material according to the present invention contains carbon fibers and has a rib portion and a web portion, in which carbon fibers in the web portion are oriented along the direction of the plane of the web portion and along the direction perpendicular to the rib portion.

The orientation direction of the carbon fibers means herein not the orientation direction of individual carbon fibers but an average orientation direction of the carbon fibers in the porous carbon material, more specifically, in the rib portion or in the web portion. The average orientation direction in which the carbon fibers are oriented, for example, along the direction perpendicular to the rib portion in a 2-dimensional plane, assuming the angle perpendicular to the rib portion as 90° means that the number of carbon fibers oriented along the directions from an angle of 45° to an angle of 135° per unit area is greater than the number of the carbon fibers oriented along the directions other than described above per unit area.

The web portion is a flat plate-like portion which is situated at the bottom of the rib portions and connects the rib portions with each other, and the orientation of the carbon fibers in which the carbon fibers are oriented along the direction perpendicular to the rib portion means that the carbon fibers are oriented along the direction perpendicular to the extending direction of the rib portion, that is, along the direction perpendicular to the longitudinal direction of the rib portion.

In the ribbed porous carbon material according to the present invention, the carbon fibers in the web portion are oriented along the direction of the plane of the web portion and along the direction perpendicular to the rib portion. The porous carbon material of such a structure has a great strength as a whole and is satisfactory in the handlability by the combined effect of the reinforcing effect against the bending along the direction parallel with the rib portion due to the orientation of the fibers in the web portion and the reinforcing effect against the bending along the direction perpendicular to the rib portion due to the beam function of the rib portion.

In the ribbed porous carbon material according to the present invention, it is not always necessary that the rib portion extends continuously from one to the other ends of the web portion but it can provide a similar effect if it is discrete portionwise.

In the ribbed porous carbon material according to the present invention, the carbon fibers are oriented in the rib portion along the direction of the thickness of the web. In the porous carbon material containing carbon fibers, since the electric conductivity and the thermal conductivity along the orientation direction of the carbon fibers are greater than those along other directions, the electric conductivity and the thermal conductivity along the direction of the thickness are improved for the entire porous carbon material due to the orientation of the carbon fibers along the direction of the thickness in the rib portion.

The degree of the orientation of the carbon fibers in the porous carbon material containing the carbon fibers can be defined by the ratio of the electric resistance and that of the strength measured along different directions of the porous carbon material.

When the specific electric resistivity is measured for the web portion after scraping off the rib portion in the flat plate-like ribbed porous carbon material according to the present invention, the ratio $\rho_{WP}/\rho_{WT}$ has a value greater than 1.0, where $\rho_{WP}$ is the electric specific resistivity measured along the direction parallel with the extending direction of the rib portion and $\rho_{WT}$ is the electric specific resistivity measured along the direction perpendicular to the extending direction of the rib portion, respectively, within the plane of the web portion. The ratio $\rho_{WP}/\rho_{WT}$ is defined as the anisotropic ratio for the specific electric resistivity in the plane.

Assuming the bending strength of the web portion measured by bending the ribbed porous carbon material according to the present invention along the direction parallel with the rib portion as $F_{SP}$ and the bending strength of the web portion measured by bending the web portion, after scraping off the rib portion, perpendicular to the rib portion as $F_{ST}$, the value for $F_{SP}/F_{ST}$ is greater than 1.0. $F_{SP}/F_{ST}$ is defined as the anisotropic ratio of the bending strength. If the anisotropic ratio of the bending strength is too great, since the resistance of the ribbed porous carbon material against the bending along the direction perpendicular to the rib portion is sometimes decreased to less than the resistance against the bending along the direction parallel with the rib portion, the anisotropic ratio of the bending strength is preferably not greater than 10. For fully utilizing the reinforcing effect due to the orientation of the carbon fibers, the anisotropic ratio of the bending strength is preferably not less than 1.2 and, more preferably, not less than 1.5.

Assuming the area of the web portion as $S_W$, the thickness thereof as $t_W$, the electric resistance and the specific electric resistivity along the direction of the thickness thereof as $R_W$ and $\rho_W$ respectively, the total projection area of the rib portion to the web portion as $S_r$, the height of the rib portion as $t_r$ and the electric specific resistivity of the rib portion along the direction of the height as $\rho_r$, the electric resistance R along the direction of the thickness for the entire ribbed porous carbon material is schematically represented as:

$R = \rho_W \cdot t_W / S_W + \rho_r t_r / S_r$

According to this equation:

$$\gamma = \frac{\rho_W}{\rho_r} = \frac{S_W}{S_r} \cdot \frac{t_r}{t_W} \cdot \frac{1}{(R/R_W - 1)}$$

can be obtained.

Assuming the measured values for the electric resistance and the electric specific resistivity of the ribbed porous carbon material along the direction of the thickness of the web portion after scraping off the rib portion as $R_W$ and $\rho_W$ respectively and the measured value for the electric resistance along the direction of the thickness for the entire ribbed porous carbon material as R, the value $\gamma$ calculated according to the right hand side of the equation is defined as the electric resistance ratio between the web portion and the rib portion. In the ribbed porous carbon material according to the present invention, the electric resistance ratio $\gamma$ between the web portion and the rib portion is greater than 1.0.

This shows that the carbon fibers are oriented more along the direction of the thickness in the rib portion than in the web portion.

A greater electric resistance ratio $\gamma$ between the web portion and the rib portion is preferred, and a porous carbon material having a value of not less than 1.2 can be prepared easily by the manufacturing method described later. Further, the specific electric resistivity $\rho_W$ along the direction of the thickness of the web portion is preferably not greater than 40 m Ω-cm.

Further, in the ribbed porous carbon material according to the present invention, the rib portion and the web portion are integrated into one piece molded product. When the rib portion and the web portion are integrated into one piece molded product, the above-mentioned mechanical strength, as well as the electric conductivity and the thermal conductivity are further improved.

The manufacturing method of the ribbed porous carbon material according to the present invention comprises extruding a starting material for molding containing carbonaceous fibers and a binder into a flat plate-like shape, then forming a ribbed portion perpendicular to the extruding direction to the extrusion molded product then applying calcination.

Referring more specially, in the manufacturing method according to the present invention, a starting material for molding containing carbonaceous fibers and a binder is extruded from an extruding machine thereby preparing a homogenous flat plate-like extrusion molded product. In this case, the carbonaceous fibers are oriented preferentially along the extruding direction. Then, the flat plate-like extrusion molded product is supplied, for example, to a rib-forming roll or molding die having a plurality of parallel grooves and they are pressed to form a rib portion along the direction perpendicular to the extruding direction (orientation direction of the fibers). By forming the ribs along the direction perpendicular to the extruding direction, that is, the orientation direction of the fibers, the starting material for molding flows into the grooves of the molding die or the roll corresponding to the rib portion of the porous carbon material, and the fibers are oriented in the rib portion along the direction of the thickness of the extrusion molded product. If the rib portion is formed parallel with the orienting direction of the fibers in the extrusion molded product, the fibers in the rib portion are scarcely oriented along the direction of the thickness. In this way, a flat plate-like ribbed molded product is produced, which has such a structure that the fibers are oriented in the rib portion along the direction of the thickness of the web portion and oriented in the web portion along the direction of the plane and perpendicular to the rib portion. The ribbed molded product is calcined in an inert atmosphere to form a ribbed porous carbon material. The carbonaceous fibers are converted into carbon fibers by calcination and bonded to each other with carbon formed from the binder or the like.

In addition, in the manufacturing method according to the present invention, since the extrusion molded product of uniform thickness is obtained by extrusion, and then supplied to the roll or the molding die to form the rib portion, it is possible to reduce the uneven mixing of the starting material and uneven supply of the starting material to the molding die or the like and the resultant ribbed porous carbon material has extremely uniform physical properties.

The starting material for molding containing the carbonaceous fibers in the manufacturing method according to the present invention comprises the following materials.

(1) Carbonaceous fibers mainly functioning as the reinforcing material for the ribbed porous carbon material.

(2) A binder for binding the carbonaceous fibers and other fillers to each other.

(3) A fluidity improving material for providing the starting molding material with a fluidity necessary for extrusion or like other operation.

(4) Solid particles for promoting the orientation of the fibers during molding.

(5) A pore controlling material for facilitating the control of pores in the porous carbon material.

It is not always necessary that the starting material for molding contains all of the materials described above. Among the materials as described above, although the carbonaceous fibers and the binder are essential, the fluidity improving material, the solid particles and the pore controlling material may optionally be used in combination.

The carbonaceous fibers mean carbon fibers or such fibers that can be converted into carbon fibers by calcination and they include, for example, pitch fibers, polyacrylonitrile fibers and rayon fibers applied with infusibilizing treatment, as well as those further applied with a heat treatment in an inert atmosphere. Those converted into carbon fibers by a heat treatment at a temperature higher than 800° C. are preferred since they suffer from less destruction to the fibers, e.g., upon extrusion.

As the carbonaceous fibers, short fibers with an average fiber length of 0.05 to 3 mm and an aspect ratio (L/D) of not less than 5 are preferred. Average fiber length greater than 3 mm is not desirable since the fluidity during fabrication of the starting material for molding is lowered making it difficult for the operation of extrusion and rib formation, and the resultant porous carbonaceous material becomes inhomogenous because fibers are entangled to each other to form pills in the steps up to the molding and the fibers are not uniformly dispersed in the molded product. On the other hand, the average fiber length of less than 0.05 mm is not preferred since the resultant porous carbon product sometimes lacks in the strength. In order that the fibers orient sufficiently upon extrusion and rib formation and provide a sufficient reinforcing effect, it is preferred that the carbonaceous fibers have an average fiber length of not less than 0.05 mm and an aspect ratio (L/D) of not less than 5. A more preferred range is from 0.1 to 2 mm for the average fiber length and not less than 10 for the aspect ratio (L/D). The blending amount of carbonaceous fibers is preferably from 3 to 50% by weight based on the entire amount of the starting material for molding. The method of measuring the fiber length and the fiber diameter are described later.

The binder used in the present invention retains the shape of the molded product before and during calcination of the molded product and is carbonized after calcination to bind the carbon fibers with each other. A binder is preferred, which has a carbonization yield higher than about 40%, metals and flows upon extrusion and formation of the rib portion and can easily be made infusible upon calcination of the molded product by a simple treatment such as heating or oxidization. As a binder, there can be mentioned, for example, a thermosetting resin such as a phenol resin or a furfuryl alcohol resin, a petroleum pitch, a coal pitch and a mixture of two or more of them. In particular, a phenol resin alone or a mixture of a phenol resin and a pitch is a preferred binder since it has a high carbonization yield and can easily be cured by heating.

The fluidity improving material used in the present invention melts and flows at a temperature (molding temperature) at which the binder used is fluidized, and provides the starting material for molding with a fluidity necessary for the operation of kneading, extrusion and formation of the rib portion. A thermoplastic resin having a melt flow rate of 30 to 500 g/10 min according to ASTM D 1238 (condition: 190/2.16) is suitably used and there can be mentioned, for example, ethylene-vinyl acetate copolymer resin, low molecular weight polyethylene, low molecular weight polypropylene, cumarone resin and petroleum resin.

Further, addition of a lubricant such as stearic acid by from 1 to 5 parts by weight based on 100 parts by weight of the starting material for molding is effective for facilitating kneading and extrusion.

Further, the advantageous effect of the present invention can be improved more by incorporating particles with the grain size from 5 to 50 μm which are solid during molding into the starting material for molding.

When the starting material for molding containing such solid particles are used, the solid particles inhibit the binder and/or the fluidity improving material from flowing through gaps between each of the carbon fibers when the starting material for molding is fluidized and cause the starting material for molding to fluidize integrally. This can provide an advantageous effect, in particular, upon formation of the rib portion by means of a molding die or a roll. That is, when such solid particles are contained, the starting material for molding integrally flows into the portion of the molding die (or the roll) corresponding to the rib portion. Accordingly, the composition of the starting material is made homogenous in the rib portion of the molded product, as well as the carbon fibers are more oriented in the rib portion along the direction of the thickness of the molded product, more specifically, of the web portion. On the other hand, if the solid particles are not blended, more binder and/or fluidity improving. material flows into the portion of the molding die (or the roll) corresponding to the rib portion, making the composition of the starting material not uniform in the rib portion, as well as the ratio of the carbon fibers oriented in the rib portion along the direction of the thickness of the web portion is made lower as compared with the case of blending the solid particles. The solid particles assist the orientation of the fibers during molding and improve the electric conductivity and the thermal conductivity of the resultant porous carbon material.

As the solid particles, carbonaceous particles are preferred. Since the carbonaceous particles remain as they are as carbon after calcination of the molded product and form a constituent for the ribbed porous carbon material, they give no particular undesired effect on the use of the ribbed carbon material. Cokes and/or graphite particles having high electric conductivity and thermal conductivity after calcination are particularly preferred. An average grain size of the carbonaceous particles is preferably from 5 to 50 $\mu$m, more preferably, from 10 to 30 $\mu$m. If the average grain size exceeds 50 $\mu$m, it is not preferred since the effect of integrally fluidizing the starting material for molding is reduced, as well as only the porous carbon material of low mechanical strength can be obtained. Further, if the average grain size is less than 5 $\mu$m, fluidity of the starting material for molding upon kneading and extrusion is reduced making the operations difficult. The blending amount of the carbonaceous particles is preferably from 5 to 40% by weight more preferably, from 10 to 30% by weight based on the entire amount of the starting material for molding.

Further, control for the pores in the resultant porous carbon material can be facilitated by incorporating the pore controlling material into the starting material for molding. The pore controlling material has such a function that it evaporates or decomposes into a gas during calcination, leaving pores thereafter. As the pore controlling material, a granular organic polymeric material which may be somewhat deformed but does not melt or flow upon operation for kneading, extrusion and formation of the rib portion is preferred since the pore can be controlled easily. As an example, there can be mentioned high density polyethylene, polymethyl methacrylate, polypropylene, polyvinyl alcohol, polystyrene and starch. The porosity and the pore diameter of the porous carbon material can be controlled by properly setting the amount and the grain size of the pore controlling material. For efficiently attaining the formation of the pores, carbonization yield of the pore controlling material (residual carbon yield after calcination) is preferably not greater than 10%. As a preferred pore controlling material, high density polyethylene or polymethyl methacrylate can be mentioned.

Referring to one example of a blend for the starting material as mentioned above for manufacturing a ribbed porous carbon material which facilitates the manufacturing operation and has balanced properties as a gas diffusion electrode for use in a fuel cell, it resides in a range from 2 to 40% by weight of carbonaceous fibers, from 20 to 50% of a binder, from 0 to 30% by weight of a fluidity improving material, from 0 to 40% by weight of carbonaceous particles, from 0 to 35% by weight of a pore forming material and, more preferably, from 5 to 30% by weight the carbonaceous fibers, from 25 to 40% by weight of the binder, from 5 to 25% by weight of the fluidity improving material, from 10 to 30% by weight of the carbonaceous particles and from 20 to 30% by weight of the pore forming material.

Each of the ingredients for the starting material is mixed and then kneaded For the kneading although kneading and molding can be applied together by a molding extruder, it is preferred that a mixture of the ingredients for the starting material is uniformly kneaded by using a kneader, which is then pelletized and supplied to an extruding machine for reducing the unevenness in the supply of the starting material thereby manufacturing more uniform porous carbon material.

After kneading, the starting material for molding is extruded and is molded. In the extrusion molding, the material is extruded from a flat die into a flat plate shape. In the case of using a thermosetting resin as the binder, if the temperature is too high or the time is too long during kneading or extrusion, curing of the binder progresses sometimes to reduce the fluidity of the starting mixture making the operations impossible. As a measure for avoiding such an undesirable state, in a case of using, for example, a phenol resin as the binder, a resin having a melting point of lower than 90° C. and a gelling time of greater than 1 min/150° C. is used and kneading and extrusion are conducted below 110° C. within 10 min.

Formation of the rib portion is conducted by using a roll or a molding die designed to form a desired rib portion along the direction perpendicular to the extruding direction. The extrudsion molded product is preferably cured preliminarily at temperature 130° to 170° C. for a period of time from 1 to 10 min and, subsequently, retained at a temperature from 140° to 170° C. and under a pressure from 20 to 60 kg/cm$^2$.

The molded product obtained in this way is calcined into porous carbon material in an inert atmosphere, that is, in an inert gas such as nitrogen or argon or under a reduced pressure at 800° to 3000° C. For avoiding the deformation of the molded product, it is preferred to conduct calcination while putting it between graphite plates. It is preferred to apply post-curing at a temperature from 150° to 500° C. prior to the calcination, since the shape of the molded product can be retained effectively during calcination.

In the ribbed porous carbon material according to the present invention, since the carbon fibers are oriented, in the web portion, along the direction of the plane of the web portion and perpendicular to the rib portion, the reinforcing effect against the bending along the direction parallel with the rib portion due to the orientation of the carbon fibers in the web portion and the reinforcing effect against the bending along the direction perpendicular to the rib portion due to the beam function of the rib portion are combined with each other to form a ribbed porous carbon material of good handlability having a great strength as a whole. Further, the electric conductivity and the thermal conductivity along the direction of the thickness of the porous carbon material are improved by the orientation of the carbon fibers in the rib portion along the direction of the thickness.

Further, according to the present invention, it is possible to easily manufacture a flat plate-like ribbed molded product having such a structure that the fibers are oriented, in the rib portion, along the direction of the thickness of the web portion while oriented, in the web portion, along the direction of the plane of the web portion and along the direction perpendicular to the rib portion by extruding the starting material for molding containing the carbonaceous fibers by an extruder thereby manufacturing a flat plate of a uniform thickness (extrusion product) in which the carbonaceous fibers are oriented along the extruding direction and then supplying the flat plate to a roll or molding die having a plurality of parallel grooves for forming the rib portion and pressing them to form a rib portion along the direction perpendicular to the extruding direction (orientation direction of the fibers). When the ribbed molded product is calcined in an inert atmosphere, a porous carbon material with high electric conductivity and thermal conductivity along the direction of the thickness and having a great strength is produced by a method of extremely high productivity combining extrusion with rolling or a pressing.

Moreover, it is possible to further improve the electric conductivity and the thermal conductivity of the porous carbon material along the direction of the thickness thereof by incorporating the carbonaceous particles into the starting material for molding, thereby promoting the orientation of the fibers.

As a result, an electrode substrate having excellent properties for use in a fuel cell can be manufactured easily.

Description will now be made referring to examples but the present invention is not restricted by the examples so long as it is within the scope of the claim of the present invention.

EXAMPLE

Figure 1:
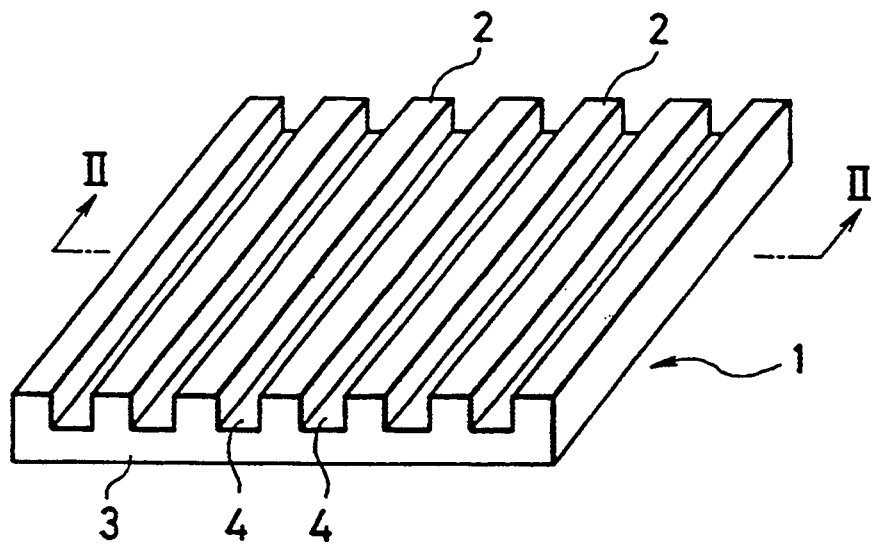
FIG. 1 is a perspective view for a preferred embodiment of a flat plate-like ribbed porous carbon material according to the present invention.

Prior to the description for the examples, measuring methods will at first be disclosed.

Measuring Method (1) Fiber diameter for carbonaceous fibers:
  Measured by measuring microscope
(2) Fiber length for carbonaceous fibers:
  Determined by actually measuring the fiber length of carbon fibers on a microscopic photograph (at known magnification ratio) and compensating by the magnification ratio.
(3) Grain size of carbonaceous particles and pore controlling material:
  Measured by a grain size distribution measuring device by a centrifugal precipitation method.
(4) Melting point of phenol resin:
  According to JIS K 6910.
(5) Gelling time of phenol resin:
  According to JIS K 6910
(6) Carbonization yield of binder and pore controlling material:
  According to JIS M 8812
(7) Melt flow rate of thermoplastic resin:
  According to JIS K 7210
(8) Bending strength for ribbed porous carbon material 1: $F_{sp}$
  According to JIS K 6911. The carbonaceous material 1 as the specimen was so set to be flexed in parallel with the rib portion 2 shown in the drawing, and the thickness of the specimen upon calculating the strength is defined as a thickness not including the rib portion 2.
(9) Bending strength of the web portion 3 of the ribbed porous carbon material 1 (along the direction in perpendicular to the rib portion 2): $F_{ST}$
  The rib portion 2 of the ribbed porous carbon material 1 was removed by cutting fabrication to obtain a flat plate-like specimen only consisting of the web portion 3. The specimen was so set to be flexed along the direction perpendicular to the rib portion 2 which was present so far and measured according to JIS K 6911.
(10) Specific electric resistivity of the ribbed porous carbon material 1:
  Plaster was filled in the grooves 4 of the ribbed porous carbon material 1 shown in the drawing so as to be at an equal height with the rib portion 2, and the ribbed porous material 1 was put between two mercury electrodes vertically in FIG. 1. A DC current E (mV) was applied between the mercury electrodes and the current I (A) flowing them was measured. The electric specific resistivity was determined by the following equation while assuming the thickness of the ribbed porous carbon material 1 including the rib portion 2 as t (cm) and the area of contact of the rib portion 2 with the mercury electrode as S (cm²):

$$\text{Specific electric resistance (m}\Omega \cdot \text{cm)} = \frac{E \cdot S}{I \cdot t}$$

(11) Electric resistance of the ribbed porous carbon material 1 in the direction of the thickness: R
  Determined in the same way as in (10) by the following equation:

$$\text{Electric resistance } (m\Omega) = \frac{E}{I}$$

(12) Specific electric resistivity of the ribbed porous carbon material 1 in the web portion 3: $\rho_W, \rho_{WT}, \rho_{WP}$
  A flat plate-like specimen consisting only of the web portion 3 was obtained in the same method as in (9) above. The specific electric resistivity was measured for the specimen.
  The specific electric resistivity in the direction or the thickness was measured in the same way as in (10) above without using plaster ($\rho_W$).
  The specific electric resistivity in the direction of the plane was measured according to JIS R 7202 ($\rho_{WT}, \rho_{WP}$).
(13) Heat conductivity or the ribbed porous carbon material 1:
  The porous carbon material 1 was put between copper plates and a temperature gradient was given so that a constant amount or heat was caused to flow in a stationary state (Q: Kcal/h).

The temperature difference ΔT (°C.) between both surfaces of the ribbed porous carbon material 1 was measured. Assuming the area of contact of the surface of the ribbed porous carbon material 1 not having the rib portion 2 (one of the surfaces of the web portion 3) with the copper plate as S (m²) and the thickness of the porous carbon material 1 including the rib portion 2 as t (m), the heat conductivity was determined according to the following equation:

$$\text{Heat conductivity (kcal/m.h. °C.)} = \frac{Q \cdot t}{S \cdot \Delta T}$$

(14) Gas permeability of the ribbed porous carbon material 1:

A cup of 80 mmφ (gas permeation area S: cm²) was put on one surface of the web portion 3 not having the rib portion 2. Air was caused to flow at a constant flow rate V (ml/h) and the pressure difference ΔP (mmAq) between both surfaces of the specimen was measured to determine the gas permeability according to the following equation:

$$\text{Gas permeability (ml/cm}^2 \cdot h \cdot \text{mmAq)} = \frac{V}{S \cdot \Delta P}$$

Example-1

After uniformly mixing, in a blade type mixer, 2 parts by weight of stearic acid added to 100 parts by weight of a starting material comprising:

| | |
|---|---|
| short carbon fibers from a petroleum pitch as the starting material, calcined at 900° C. as the carbonaceous fibers: average diameter of 14 μm, average fiber length of 0.4 mm | 10% by weight |
| coal pitch cokes as the carbonaceous particles: average grain size of 20 μm | 20% by weight |
| novolac type powdery phenol resin as the binder: melting point at 81° C., gelling time of 1.2 min/150° C., carbonization ratio of 54% by weight | 35% by weight |
| ethylene-vinyl acetate copolymer resin as a flow improving material: vinyl acetate content of 19% by weight, melt flow rate of 150 g/10 min (190/2.16) | 12% by weight |
| polethylene resin as the pore controlling material: melting point at 120° C., average grain size of 80 μm | 8% by weight |
| polymethylmethacrylate resin as the pore controlling material: softening point at 170° C., average grain size of 80 μm | 15% by weight, | they were kneaded in an extruder type kneader at a temperature of 100° C. for 5 min and then extruded to prepare cylindrical pellets having a diameter of 3 mm. Then, the pellets were supplied to an extruder having a coat hanger die with a screw diameter or 90 mm and a screw length/diameter ratio (L/D) or 24, and extruded at a temperature or 100° C. and at an extrusion rate of 40 kg/h into a flat plate of 1.3 mm thickness and 650 mm width. The temperature in the kneading portion was 110° C. and the staying time was 6 min. Then, the extruded flat plate was cut at a 650 mm interval and passed through a preliminary curing furnace kept at 145° to 160° C. to conduct preliminary curing and, subsequently, the flat plate was supplied into a molding die comprising an upper die having a flat surface and a lower die having grooves each of a rectangular cross section of 1.2 mm depth and 1.0 mm width disposed in parallel arrangement, with the distance between the centers for each of the groove being 2.0 mm and kept at a temperature of 160° C., such that the grooves of the molding die, more specifically, the longitudinal direction of the grooves in the molding die was perpendicular to the extruding direction of the flat plate, and pressed under a pressure of 50 kg/cm² for three min to prepare a ribbed portion 2. The molded product was taken out from the molding die and a temperature was elevated in a nitrogen atmosphere from 150° C. to 500° C. for 10 hours to conduct preliminary calcination together with post curing. The preliminary calcined products were put between graphite plates at a ratio of 20 sheets of the products per one sheet of the graphite plate of 10 mm thickness and calcined elevating a temperature up to 2000° C. for 30 hours in a vacuum furnace to manufacture a ribbed porous carbon material 1 as shown in FIG. 1.

Comparative Example-1

Ribbed porous carbon material was manufactured in the same way as in the example except for forming the ribbed portion in parallel with the extruding direction of the flat plate.

Example-2

A mixture prepared by adding 3 parts by weight of stearic acid based on 100 parts by weight of a starting material for molding comprising:

| | |
|---|---|
| carbonaceous fibers prepared by oxidizing petroleum pitch yarns to infusibilize and then calcining them at 600° C. (average diameter of 12.5 μm, average fiber length of 1 mm) | 38% by weight |
| phenol resin used in Example-1 | 25% by weight |
| ethylene-vinyl acetate copolymer resin used in Example-1 | 37% by weight | was treated in the same procedures as those in Example-1 to manufacture a flat plate-like ribbed porous carbon material 1.

Comparative Example-2

A flat plate-like porous carbon material without ribs was manufactured in the same procedures as those in Example-2 except for using a molding die comprising an upper die and a lower die both off which were Flat. Rib portions were formed parallel with the extruding direction by cutting fabrication so as to have the same dimension as that of flat plate-like ribbed porous carbon material 1 in Example-2 to manufacture a ribbed porous carbon material.

Characteristic values obtained for each of the ribbed porous carbon materials are shown in Table 1.

Figure 2:
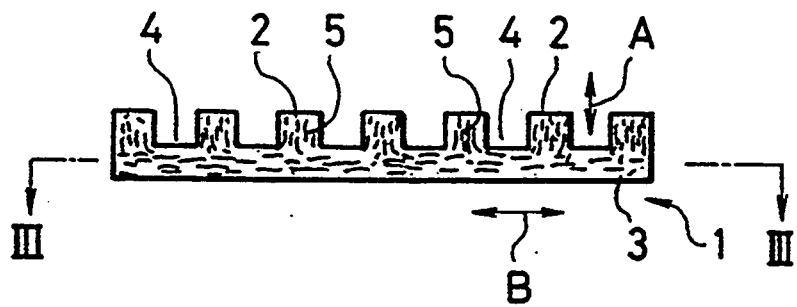
FIG. 2 is an explanatory view schematically illustrating the orientation of fibers in a cross section taken along line II—II shown in FIG. 1.
Figure 3:
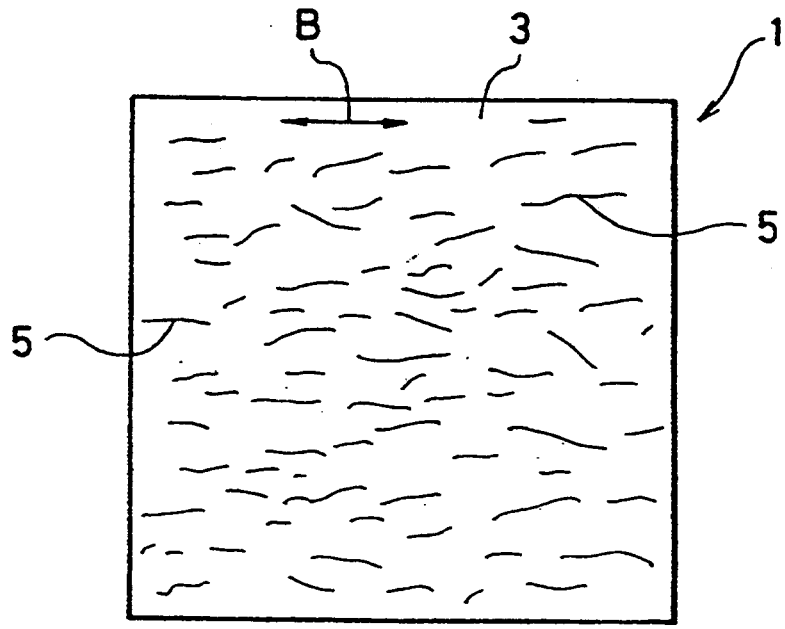
FIG. 3 is an explanatory view schematically illustrating the orientation of fibers in a cross section taken along lines III—III shown in FIG. 2.

As apparent from them, in the ribbed porous carbon material 1 according to the present invention, as shown schematically in FIG. 1 to FIG. 3, it can be said that the carbon fibers 5 are oriented in the rib portion 2 along the direction A which is the direction along the thickness of the web portion 3, while oriented in the web portion 3 along the direction B which is the direction along the plane of the web portion 3 and along the direction in perpendicular to the rib portion 2.

TABLE 1

| | Example 1 | Comparative Example 1 | Example 2 | Ex |
|---|---|---|---|---|
| Specific electric resistivity of the ribbed porous carbon material (mΩ·cm) | 30.6 | 50.4 | 36.4 | 51.6 |
| Specific electric resistivity of web portion in the direction perpendicular to rib portion: $\rho_{WT}$ (mΩ·cm) | 20.3 | 25.8 | 21.2 | 26.3 |
| Anisotropic ratio within the plane of the specific electric resistivity in web portion: $\rho_{WP}/\rho_{WT}$ | 1.25 | 0.81 | 1.29 | 0.77 |
| Specific electric resistivity of web portion in the direction of thickness: $\rho_W$ (mΩ·cm) | 29.8 | 30.2 | 33.3 | 32.4 |
| Electric resistance ratio between web portion and rib portion: $\gamma$ | 1.92 | 0.98 | 1.74 | 1.04 |
| Heat conductivity (kcal/m·h·°C) | 1.4 | 0.9 | 1.3 | 0.8 |
| Bending strength $F_{SP}$ (kg/cm$^2$) | 172 | 118 | 156 | 91 |
| Anisotropic ratio of the bending strength: $F_{SP}/F_{ST}$ | 1.77 | 0.77 | 1.83 | 0.56 |
| Gas permeability (ml/cm$^2$·h·mmAq) | 523 | 516 | 1151 | 1095 |

We claim:

1. A method of manufacturing a ribbed porous carbon material, comprising the steps of:
   extruding a starting material for molding containing carbonaceous fibers and a binder in a flat plate-like shape state;
   forming a rib portion to an extruded molded product along a direction perpendicular to a direction of extrusion by means of rolling and subsequently calcining the rib portion and the extruded molded product.

2. A method of manufacturing a ribbed porous carbon material as in claim 1, wherein the starting material for molding further contains carbonaceous particles with a grain size of from 5 to 50 μm.

3. A method of manufacturing a ribbed porous carbon material, comprising the steps of:
   extruding a starting material for molding containing carbonaceous fibers and a binder in a flat plate-like shape state;
   forming a rib portion to an extruded molded product along a direction perpendicular to a direction of extrusion by means of press forming and subsequently calcining the rib portion and the extruded molded product.

4. A method of manufacturing a ribbed porous carbon material as defined in claim 3, wherein the starting material for molding further contains carbonaceous particles with a grain size of from 5 to 50 μm.

* * * * *